(12) United States Patent
Wenzel

(10) Patent No.: US 6,187,131 B1
(45) Date of Patent: Feb. 13, 2001

(54) SEAMING TAPE FOR ELIMINATING PEAKING AND PROFILING IN TENSIONED SEAMS

(75) Inventor: Michael David Wenzel, Pleasanton, CA (US)

(73) Assignee: Orcon Corporation, Union City, CA (US)

( * ) Notice: Under 35 U.S.C. 154(b), the term of this patent shall be extended for 0 days.

(21) Appl. No.: 09/318,781

(22) Filed: May 25, 1999

(51) Int. Cl.⁷ ............................. B29C 65/00; B32B 3/00; B32B 15/04
(52) U.S. Cl. .................. 156/304.7; 156/229; 156/304.3; 156/304.6; 428/58; 428/354
(58) Field of Search .............................. 156/304.7, 304.6, 156/304.3, 229; 428/343, 347, 354, 57, 58

(56) References Cited

U.S. PATENT DOCUMENTS

| | | |
|---|---|---|
| 2,552,114 | 5/1951 | Reinhard . |
| 2,673,169 | 3/1954 | Finch . |
| 2,890,145 | 6/1959 | Milnes . |
| 3,413,678 | 12/1968 | Krantz . |
| 3,533,876 | 10/1970 | Burgess . |
| 3,972,768 | 8/1976 | Hill . |
| 4,416,713 | 11/1983 | Brooks . |
| 4,581,269 | 4/1986 | Tilman . |
| 4,749,433 | 6/1988 | Johnston et al. . |
| 4,919,743 | 4/1990 | Johnston et al. . |
| 5,198,300 | 3/1993 | Matthews et al. . |
| 5,691,051 | 11/1997 | Matthews . |
| 5,693,171 | 12/1997 | Foster et al. . |
| 5,800,664 | 9/1998 | Covert . |

*Primary Examiner*—Mark A. Osele
*Assistant Examiner*—Sue A. Purvis
(74) *Attorney, Agent, or Firm*—O'Melveny & Myers LLP

(57) ABSTRACT

The invention concerns a seaming tape for seaming carpeting and other flexible materials, and method of seaming carpet thereby. The seaming tape is reinforced by rigid strips so that the seam does not visibly peak, profile, or otherwise bulge visibly when the flexible material is placed in tension in a direction perpendicular to the seam. The seaming tape comprises an adhesive, a reinforcing scrim, a flexible backing, and rigid strips that are aligned parallel to the scrim, on opposite sides of the longitudinal centerline of the scrim, and spaced apart a distance from the centerline of the scrim. The rigid strips are sized and placed so that after a seam is made using the tape, the rigid strips are on opposite sides of the seam and aligned parallel to the seam. When the seamed material is stretched, the rigid strips resist flexure, resulting in a seam that stays virtually flat and invisible.

19 Claims, 3 Drawing Sheets

SEAMING TAPE FOR ELIMINATING PEAKING AND PROFILING IN TENSIONED SEAMS

BACKGROUND OF THE INVENTION

1. Field of the Invention

The present invention relates to tapes and other materials for joining separate pieces of sheet material along a butt seam. More particularly, the invention relates to making invisible and less visible seams during installation of wall-to-wall carpeting that is stretched (placed in tension) in a direction perpendicular to the seam.

2. Description of the Related Art

There are two primary methods for installing wall-to-wall carpeting, the glue-down method and the stretch-in method. The present invention relates to the stretch-in method of installation, predominately used for residences. The stretch-in method involves fastening the carpet to the floor along one edge of the area to be carpeted, and then stretching the carpet to obtain a smooth, flat carpet surface. The stretched carpet is then fastened to the floor at the opposite edge of the carpeted area, and the process is repeated for the remaining edges. The carpet remains in tension after the installation is completed. A layer of padding material is typically installed under the carpet before it is fastened to the floor. The stretch-in process is intended to remove any wrinkles or unevenness in the carpeting, resulting in a flat, safe, and visually appealing carpet installation.

If, as is often the case, the area to be carpeted is wider than the carpet as produced by the carpet mill, two or more pieces of carpet must be joined along a seam. It is desirable for the seam to conform to the following requirements. First, the seam must be sufficiently strong and durable to maintain its integrity during the life of the carpet, and withstand the tension from the stretch-in installation process. Second, for cosmetic purposes, the seam should be as invisible as possible. Third, the seaming process should be as simple and as economical as possible.

Methods for seaming carpet traditionally included sewing and using various mechanical fasteners, but the predominate method used today employs carpet seaming tape. Carpet seaming tapes are typically comprised of a knitted or woven low-profile scrim of high-strength fiber about three to six inches wide, a strip of paper or foil backing material underneath the scrim, and a layer of thermoplastic resin adhesive overlaying the scrim. To form a seam using the face-seaming process, the two pieces of carpet to be seamed are placed with the tufts facing up and edges abutting over a length of seaming tape. The seaming tape is centered under the two abutting edges with the layer of adhesive facing the carpet backing. A hot seaming iron, or other suitable implement, is used to melt the thermoplastic adhesive and the carpet backing is pushed into the molten thermoplastic adhesive. The adhesive quickly sets, forming a permanent seam. This method is disclosed by, e.g., U.S. Pat. Nos. 3,972,768, 4,097,445 and 4,416,713. An alternate method of seaming, called back seaming, achieves the same result as face seaming but involves placing the carpets face down so that the carpet backing faces up. The seaming tape is placed over the seam with the adhesive towards the carpet backing and heat is applied through the paper backing of the tape. Back seaming is used for constructing decorative carpet panels from many different pieces of carpet whereas face seaming is commonly used for joining large pieces for covering a large area.

Pressure-sensitive adhesives, epoxy adhesives, latex adhesives, and other adhesives may be used to supplement or replace the thermoplastic adhesives on seaming tapes. However, thermoplastic adhesives are widely used because they offer the advantages of moisture resistance, low cost, creep resistance, compatibility with a wide range of carpet backings, repositionability, ease of application, and no exposure to harsh chemicals.

Seam peaking is a near universal problem with seams made using seaming tape in stretched carpet installation. Various seaming tapes and methods have been introduced to minimize seam peaking, some examples of which are described in U.S. Pat. Nos. 4,919,743 (Johnson, et.al., 1990), 5,198,300 (Matthews, et.al., 1993), 5,691,015 (Matthews, 1997), and 5,693,171 (Foster, et.al., 1997). Seam peaking occurs when a taped carpet seam is stretched in a direction perpendicular to the seam. Seam peaking appears as a visible hump or ridge running down the length of the seam. Much to the surprise of many an inexperienced carpet installer, the more an installer stretches the carpet, the more prominent the peaking will become.

There are various theories to explain seam peaking. According to one theory based on classical mechanics, seam peaking is caused by the offset between the tension-carrying plane of the carpet backing and the tension-carrying fibers of the seaming tape. This offset is typically on the order of 0.015 inches to 0.15 inches. Typical seaming tapes and carpet backings, both being relatively flexible, cannot resist the bending moment created by the offset and opposing tensions in the tape and carpet backing. Hence, the backing and tape will bend upwards together until the tension carrying fibers of the carpet backing are more closely in line with the mid-plane of the carpet backing. According to one theory based on classical mechanics, at equilibrium the bending moment created by the offset of the opposing tensile forces will be exactly equal to the reverse bending moment presented by the bending resistance of the carpet backing and seaming tape system as a whole. If the bending resistance of the backing and tape is zero or nearly zero, as appears to be the case for many carpets and tapes, the seam will peak until the offset between opposing tension forces is also zero or near zero. That is, the tension carrying fibers of the seaming tape will rise until they are in line with midplane of tension (also called the shear centroid) in the carpet backing.

Many efforts have been made to prevent seam peaking in carpeting. Johnson '743 and U.S. Pat. No. 4,749,433 (Johnson, et.al., 1988) disclose perhaps the most widely adopted method today, the use of enhanced width seaming tape. However, such tape does not prevent seam peaking, because it is as flexible as ordinary seaming tape. Instead, it appears to operate by mitigating the visual effect of peaking by spreading the peak over a wider strip of tape. The wide tape does not always produce satisfactory results, depending on the type of carpet used, placement of the seam with respect to room lighting, and various other factors. Wide tape is also about twice as expensive as regular tape simply because it consists of about twice as much material for a given length of seam.

Another approach is to adhere the seam to the floor by using a seaming tape with a pressure sensitive adhesive on its reverse side, as disclosed by Foster '171. Most carpet is installed over a foam pad, so this method requires fastening the pad to the floor with nails or staples in the area of the seam to prevent the pad from lifting or expanding upwards under the tape. However, nailing into the floor is often not possible or desirable, and requires additional time and materials. Therefore, this method is not widely used.

Yet another approach has been to use seaming tapes with relatively rigid members, such as steel or high-modulus plastic rods, bars, or wires, placed across the center of the seaming tape. This method is disclosed by Matthews '300. Discrete rigid members are placed on the tape so that they will extend across the seam at regular intervals after the seam is made. A variation on this method, disclosed by Matthews '051, utilizes a single relatively rigid continuous member running down the center of the seaming tape. The center strip also extends across the finished seam. Whether discrete members or a single continuous member are used, the principle of operation is the same: to stiffen the carpet backing and tape system to resist the bending moment created by offset and opposing tension forces. It appears feasible to find commonly available and inexpensive materials that have a sufficiently high bending moment of inertia and also have a thin profile. A thin profile is needed so that the rigid members do not create noticeable lumps or a ridge under the carpet when resting on a typical carpet pad. It has been demonstrated that it is possible to construct tapes with thin rigid members that are practical to use and reduce seam peaking as predicted by the classical mechanical theory of seam peaking explained above.

Unfortunately, it has also been discovered that the use of relatively rigid members across the seam still creates a visible bulge running the length of the seam when the carpet is stretched across the seam. This is true although the seam may be completely flat and invisible while the seamed carpet is in an unstretched state. Thus, it is not the thickness of the rigid members that causes the bulge. Instead, the bulge appears to be caused by another mechanism. Under tension, the rigid members, unlike ordinary seaming tape, do not bend noticeably. However, each rigid member exerts upward pressure on the carpet backing, that results in the profile of the rigid member becoming visible as a bulge on the upper face of the carpet. This mode of bulging is referred to as seam "profiling" because the profile of the rigid member becomes visible.

Profiling can also be explained by classical mechanics, once it is recognized that placing the rigid member across the seam results in a tension across the rigid member. This is because the rigid member is more inelastic, i.e., less able to stretch, than the scrim. Therefore, the tension that would be carried by the scrim in an ordinary tape is transferred to the rigid member. Once the rigid member is in tension, it will not bend noticeably because of its stiffness, but it will transfer its bending moment to the relatively flexible carpet backing. The flexible carpet backing is not able to resist this bending moment and flexes up, allow the rigid member to rise relative to the backing. The rigid member rises in the carpet backing thus reducing the offset in tension forces until equilibrium is reached. At equilibrium, according the classical mechanical theory of seam profiling, the bending moment created by the offset tension forces exactly equals the reverse moment exerted by the carpet and tape on the edges of the rigid member. Meanwhile, the rising rigid member has pushed the carpet backing upwards, causing a bulge to appear on the upper surface of the carpet.

Accordingly, the need exists for a carpet seaming tape that can be used to produce strong, reliable, and permanent seams, able to substantially reduce or eliminate peaking, profiling, and other cosmetic anomalies in stretched carpet. Such a tape should be easy and economical to use with conventional seaming methods such as face seaming using conventional seaming irons.

SUMMARY OF THE PRESENT INVENTION

The present invention provides the longstanding but unfilled need for a seaming tape that produces a flat and invisible seam with relative ease and economy. The seaming tape can be manufactured inexpensively and is easy to use with conventional carpet seaming methods. The seaming tape is produced by attaching thin, rigid members to the tape positioned so that they will not extend across the seam after it is made. Like some prior art methods, the rigid members prevent seam peaking by adding stiffness to the seam. However, unlike all prior art methods, the rigid members also prevent seam profiling because the members do not extend across the seam and thus do not carry tension. The present invention may also be used for producing seams in a wide variety of flexible materials and is particularly advantageous when tension is to be applied across the seam. However, the primary commercial application for the invention is presently for installation of wall-to-wall carpeting.

Therefore, the primary objective of this invention is to provide a seaming tape that eliminates seam peaking and seam profiling in carpets or other flexible sheet materials, resulting in an essentially flat, invisible seam when applied using conventional methods for seaming carpet. A further objective of the invention is to provide a seaming tape that provides a durable and permanent seam. A still further objective is to provide a seaming tape that can be manufactured relatively inexpensively, and is convenient to use.

In one embodiment of the invention, a seaming tape is made beginning with a standard width seaming tape such as the tape sold under the trade name "K-40" and commercially available from Orcon Corporation in Union City, Calif. Two thin strips of relatively rigid plastic material, such as a high density polyethylene or mild steel, are positioned underneath and parallel to the tape. One edge of each strip is positioned about one-eighth to three-eighths (0.13 to 0.38) inches from the centerline of the seaming tape, symmetrically with respect to the other strip about the centerline. The strips are adhered to the paper backing of the seaming tape with a suitable high temperature adhesive. The seaming tape is now modified for use according to the invention and will produce a flat, invisible seam when used to seam a carpet using the conventional face seaming method.

In yet another embodiment, dual strips of a relatively rigid, high melting point plastic are extruded onto a kraft paper backing or other suitable flexible backing. The strips are positioned relative to the centerline of the tape as described above. The strips are molten when exiting the extrusion die and thus adhere to the flexible backing without the use of adhesive. The strips are allowed to cool and harden. The flexible backing with attached strips is then used to make seaming tape according to conventional methods, described generally as follows. A scrim of high-strength yarns, such as fiberglass yarns, is knitted and adhered to the flexible backing opposite to the side on which the rigid strips are adhered. A dry lubricant, such as a silicone emulsion, is applied to the flexible backing on the same side as the rigid strips, and dried in a low temperature oven. A thermoplastic adhesive is extruded over the scrim and spread or formed to a uniform width. The thermoplastic adhesive is allowed to cool and the tape is rolled and packaged to facilitate shipping and handling. The tape will produce an essentially flat, invisible seam when used to seam a carpet using the conventional face seaming method.

The invention includes various refinements intended to improve the performance of the seaming tape in various respects. One refinement is to use a low-melting point thermoplastic adhesive for the seaming adhesive, thereby permitting the use of correspondingly less heat resistant plastics for the rigid strips. Such plastics are less expensive and easier to extrude, reducing the product cost. Another improvement is to use tapes according to the invention in conjunction with seaming irons having specially shaped platens for melting and forming the thermoplastic adhesive. Such a seaming iron will direct the thermoplastic away from the top of the rigid members towards the center of the seam, and taper the adhesive along both edges of the seam, thereby further minimizing profiling of the seaming tape. Yet another refinement is to divide the rigid strips into essentially independent segments in the manner described in U.S. Pat. No. 5,691,051, thereby facilitating rolling the seaming tape into a compact roll for shipping and storing.

Other and further objects, features, advantages and embodiments of the present invention will become apparent to one skilled in the art from reading the detailed description of the invention together with the drawings.

DESCRIPTION OF PREFERRED EMBODIMENTS

Figure 1:
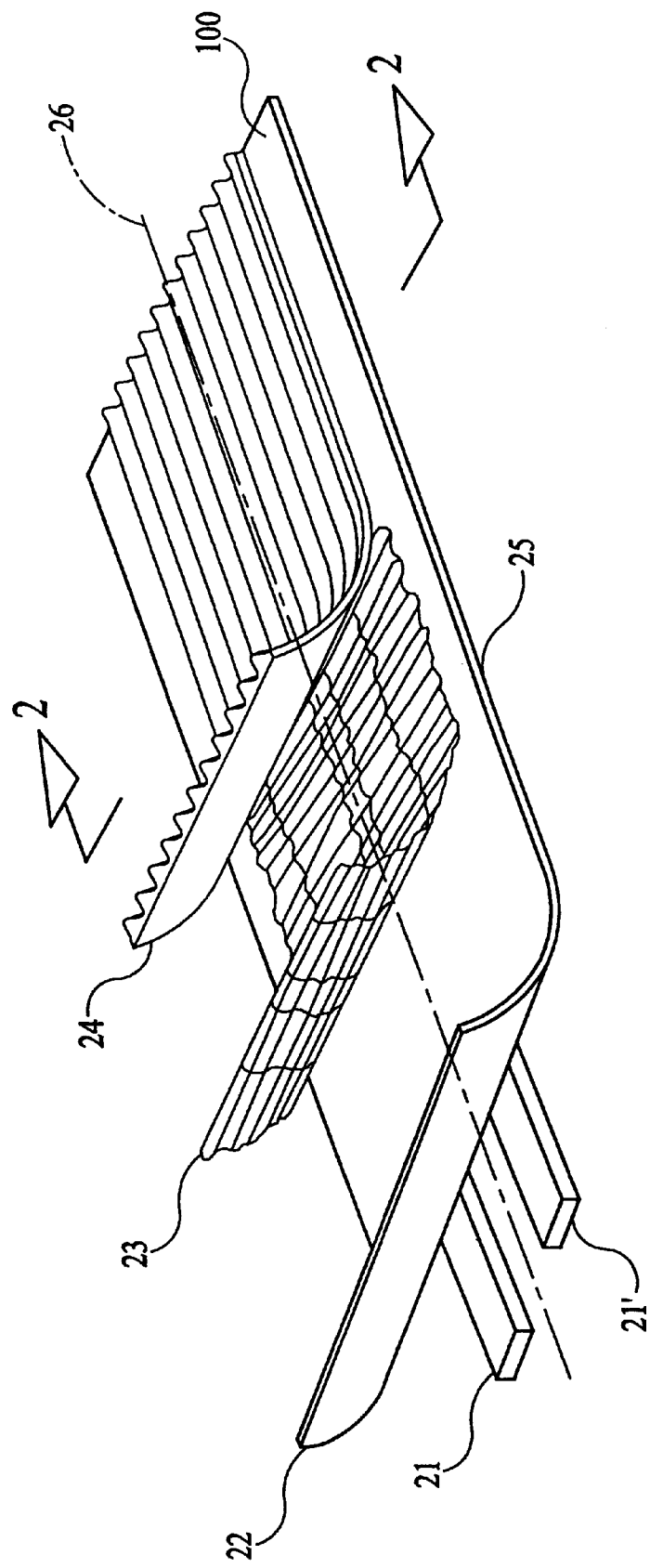
FIG. 1 is a fragmentary perspective view showing the seaming tape of the present invention with the individual layers thereof being peeled back to expose the underlying layer of material.
Figure 2:
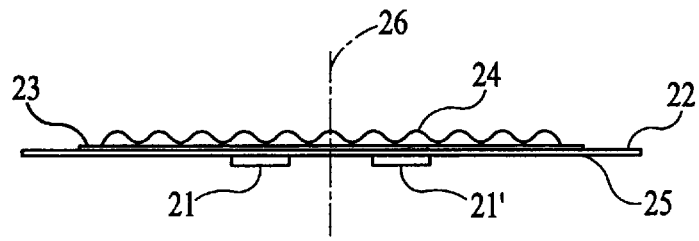
FIG. 2 is a cross sectional view of a seaming tape according to the present invention, taken along the line and in the direction indicated by the arrows 2—2 on FIG. 1.

A first embodiment of the improved seaming tape is indicated generally in FIG. 1, and a cross section is shown in of the same is shown in FIG. 2. The vertical scale in both figures is exaggerated for clarity, causing the components of the tape to appear somewhat thicker than the preferred embodiments described herein.

Referring to FIGS. 1 and 2, seaming tape 100 is preferably constructed from thermoplastic adhesive 24, scrim 23, flexible barrier 22, and two rigid strips 21 and 21'. Flexible barrier 22 may be omitted but is preferably included.

Rigid strips 21 and 21' may be made from various relatively high-modulus materials including various plastics and metals. For the purposes of the embodiments disclosed herein, the materials preferably have a modulus of elasticity (also known as Young's modulus) of about 300,000 pounds per square inch (psi) or greater. A "strip" is a relatively thin piece of material of essentially constant cross section along its length, which is relatively long compared to its width. "Width rigidity" means the product of the modulus of elasticity and the area moment of inertia per unit length of a strip, averaged over cross sections that are taken parallel to the long edges of the strip at representative intervals across the width of the strip. Width rigidity may be thought of as the stiffness of a strip across its width. It is primarily a function of the modulus of elasticity and the shape of the cross section of the strip. The term "rigid strip" refers to a strip that has a width rigidity of not less than about 0.15 square inch pounds (in$^2$lbs) per unit length of the strip.

The rigid strips 21 and 21' may be relatively flexible along their lengths, so that they may be rolled around a cylindrical core. However, the rigid strips must be sufficiently stiff across their width so that they maintain a flatness that is essentially invisible while counteracting the bending moment created by offset and opposing tension forces in the seam when the seamed carpet is stretched. For the embodiments disclosed herein, rigid strips 21 and 21' preferably have a width rigidity between about 0.15 to 50 in$^2$lbs, depending on the width of the strips. For any rigid strip made from a given material, the optimum width rigidity is roughly proportional to the cube of the width of the strip. For example, if strip 'A' is twice as wide as strip 'B', and both are made from the same material, the preferable width rigidity of strip 'A' is about eight times greater than strip 'B'. For a rigid strip about 0.4 inches wide, the width rigidity is preferably about 0.3 to 2.4 in$^2$lbs.

Rigid strips 21 and 21' are about 0.1 inches to 2.0 inches wide, preferably about 0.3 to 0.5 inches wide, and are essentially as long as the seaming tape. Seaming tape is typically sold in lengths of 66 feet and is cut to the length of the seam at the job site. Preferably, the rigid strips 21 and 21' are sufficiently flexible along their length to permit a 66 foot long length of seaming tape 100 to be rolled into a coil less than about 12 inches in diameter for shipping and merchandising purposes. Alternatively, the rigid strips may be scored at regular intervals along their lengths to facilitate rolling the seaming tape into a roll. In another embodiment, the rigid strips may be broken into discrete sections at intervals along their length. The sections of rigid strip may be any length but preferably are no shorter than about one-half inch and no longer than about three inches to facilitate rolling the seaming tape into a roll. The sections of rigid strip should be spaced apart no more than about one-half inch, preferably about one-tenth inch, along the length of the seaming tape. For the purposes of the embodiments disclosed herein, "rigid strips" includes rigid strips that are scored or sectioned as described above.

Rigid strips 21 and 21' are mounted to tape 100 in positions substantially parallel to and spaced from the longitudinal centerline 26 of seaming tape 100. Each rigid strip 21 and 21' is spaced about 0.05 to 0.50 inches away from and on opposite sides of the centerline, leaving a gap between the strips of about 0.10 to 1.0 inches. If plastic is used to make the rigid strips, it is desirable to use a plastic that softens at a temperature higher than the melting point of the thermoplastic adhesive. This is so the rigid strip will not melt or deform during the seaming process. For example, the polyamide commonly known as nylon type 6/6, with a melting point between 490° and 509° F. and a flexural modulus between 410,000 and 470,000 pounds per square inch (psi), would be suitable for use with most seaming tapes. For seaming tapes having lower melting point adhesives, polyethylene teraphthalate (PET), with a melting point between between 412° and 509° F. and a flexural modulus of 350,000 to 450,000 psi would be adequate. Various other plastics and other materials are also available that are sufficiently heat resistant and have comparable or higher flexural modulus' than the aforementioned plastics. If either of the above plastics is used, the preferable thickness of the rigid strips is from about 0.015 inches to 0.030 inches. Strips of such thickness will have sufficient width rigidity to prevent peaking and profiling, without causing a noticeable lump under the carpet or making the seaming tape too stiff to coil into a roll.

The rigid strips 21 and 21' may also be made from various metals, such as mild steel or aluminum. Steel and like materials offer the advantage of a high modulus of elasticity, and permit the use of thinner, lower profile strips. For example, if mild steel is used, the preferable thickness is about 0.005 to 0.010 inches. The preferable configuration of rigid strips made from metal would otherwise be the same as for plastic. A disadvantage of steel is that it cannot be cut to length at the job site with ordinary carpet shears, and thus is less convenient to use compared to the plastic strips.

Referring to FIGS. 1 and 2, rigid strips 21 and 21' are adhered to the underside of the flexible barrier 22. The underside of flexible barrier 22 is the side opposite to the side to which the scrim 23 and thermoplastic adhesive 24 are attached. It is the side that typically faces the floor during installation. Rigid strips 21 and 21' may also be adhered to the upper surface of flexible barrier 22, between scrim 23 and flexible barrier 22 or in the alternative, on the upper surface of scrim 23. A variety of suitable adhesives may be used to adhere rigid strips 21 and 21' to flexible barrier 22. For example, pressure-sensitive adhesives, epoxies, latex, and acrylic adhesives may be suitable. Preferably, rigid strips 21 and 21' are extruded directly onto flexible barrier 22, where they bond to the barrier while molten, eliminating the need for an adhesive. In the alternative, flexible barrier 22 and rigid strips 21 and 21' are made from the same material and extruded together as a single piece.

The invention will function with placement of rigid strips 21 and 21' either below flexible barrier 22 or above it, and the determination of desired placement will be a trade-off between various considerations. For example, placing the rigid strips 21 and 21' above flexible barrier 22 (between flexible barrier 22 and scrim 23) has the advantage of making use of thermoplastic adhesive 24, which flows through scrim 23, to help adhere rigid strips 21 and 21' to flexible barrier 22 and to scrim 23, making it an integral part of the tape. However, such a placement causes wrinkling of scrim 23, thereby interfering somewhat with bonding of scrim 23 to the carpet backing and making the seaming tape 100 more difficult to manufacture. Placing the rigid strips 21 and 21' underneath flexible barrier 22 leaves the scrim 23 undisturbed, but requires care to ensure a permanent, reliable bond between rigid strips 21 and 21' and flexible barrier 22. In any case, if the seaming tape is to function as designed according to the invention, the rigid strips 21 and 21' must be permanently and securely bound to conform to scrim 23, which is in turn bonded securely to the carpet backing after the seam is made.

Whether or not rigid strips 21 and 21' are placed above or underneath scrim 23, each rigid strip 21 and 21' is positioned on the tape 100 in a position substantially parallel to, spaced apart from, and on opposite sides of centerline 26 of scrim 23. Preferably, rigid strip 21' is positioned symmetrically with respect to rigid strip 21 around the longitudinal centerline 26 of scrim 23. Rigid strips 21 and 21' are on opposing sides of centerline 26 and do not extend across it. Rigid strips 21 and 21' are aligned substantially parallel to centerline 26. When the seam is complete, rigid strip 21 is on one side of the seam and parallel to the seam, while rigid strip 21' is on the opposite side of the seam and parallel to the seam, and centerline 26 is essentially aligned with the seam.

Flexible barrier 22 may also be omitted entirely, as its primary purpose is to facilitate manufacture and installation of the seaming tape, and it has little or no function after the tape is installed. However, the utility of flexible barrier 22 to both manufacturing and installation of the tape makes it desirable to include it for most applications. For example, it can serve as a carrier for the rigid strips 21, scrim 23, and thermoplastic adhesive 24 during the manufacturing process and during subsequent handling of seaming tape 100. Furthermore, it prevents thermoplastic adhesive 24 from adhering to the underlying carpet pad or floor during installation.

Flexible barrier 22 is preferably made from 48 pound creped unbleached kraft paper, slit to a width of three to six inches. Other types of paper, and other flexible sheet materials, may also be used so long as sufficiently durable and heat resistant to withstand the manufacturing and installation process. Flexible barrier 22 may also be formed of one piece with rigid strips 21, and/or of the same material as rigid strips 21.

Scrim 23 carries tensile forces across the seam when the seamed carpet is stretched. Scrim 23 has a longitudinal centerline. Preferably, scrim 23 is essentially symmetrical about its centerline and is of constant width. Scrim 23 is preferably two to five inches wide. Scrim 23 is made of high strength filaments, preferably high strength yarns, such as five pound test fiberglass continuous filament yarn, in the direction perpendicular to the seam. The scrim 23 is preferably knitted with five to ten fiberglass yarns per inch of length. Scrim 23 is preferably incorporates one to four lower strength yarns, such as one pound test polyester yarn, per inch of width in the direction parallel to the seam. Scrim 23 may also be made from woven mesh, or non-woven filaments, so long as the scrim incorporates a sufficient number of sufficiently strong filaments to carry the tensile load imposed by a stretched carpet across the seam.

Thermoplastic adhesive 24 is preferably made from a blend of polyester, tackifying resin, and various modifiers for adjusting the melt temperature, tackiness, hardness, odor, and color of the adhesive, among other things. A wide variety of blends for thermoplastic adhesive suitable for seaming carpets are known to those skilled in the art or are described in detail in the art. For example, see U.S. Pat. No. 3,533,876 (Burgess, 1970) which is incorporated herein by reference. Any adhesive suitable for seaming carpets may be used, whether thermoplastic or not. However, at the present time, thermoplastic adhesives are the only seaming tape adhesives that have proven to be commercially viable for stretch-in applications. Whatever type of adhesive is used, adhesive 24 is attached to at least one surface of scrim 23 and preferably is spread across the width of scrim 23.

Figure 3:
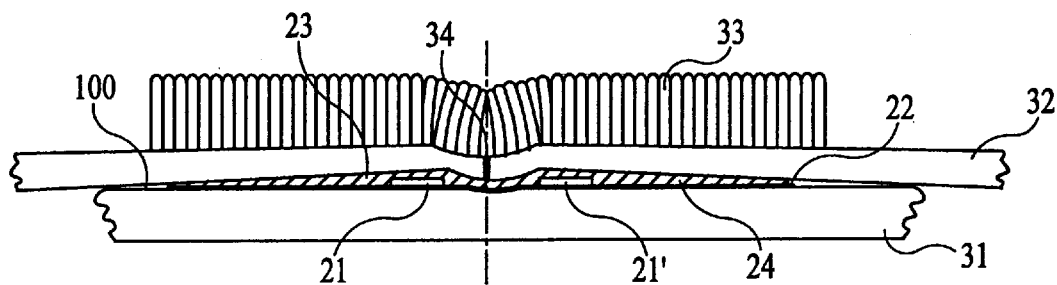
FIG. 3 is a cross sectional view of a seaming tape according to the present invention installed across a typical carpet seam, showing the configuration of the seam before tension is applied to the carpet.
Figure 4:
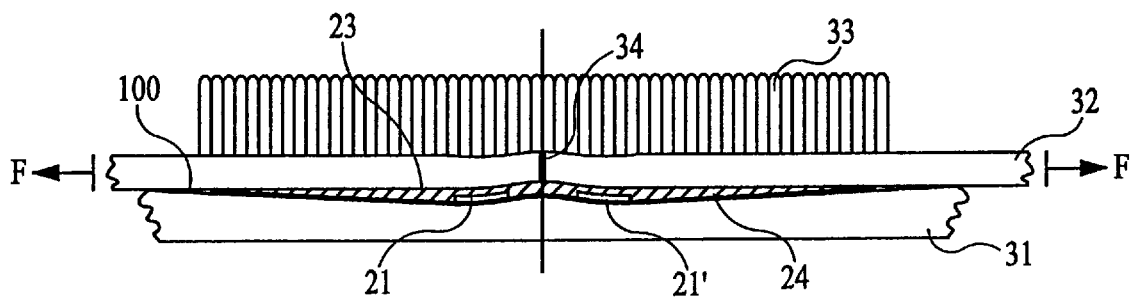
FIG. 4 is a cross sectional view of a seaming tape according to the present invention installed across a typical carpet seam, showing the configuration of the seam after tension is applied to the carpet.

Various refinements in the configuration of the seaming tape 100 are useful for improving its performance, making it easier to use, and reducing its cost. Some of these refinements are illustrated in FIGS. 3 and 4. FIG. 3 depicts a cross section of a seaming tape according to the present invention as applied to a carpet seam, shown in an unstretched condition. FIG. 4 depicts a cross section of the same tape and carpet seam in a stretched condition. The vertical scale of FIGS. 3 and 4 is exaggerated for clarity.

Referring to FIG. 3, a piece of carpet, comprised of backing 32 and tufts 33, is butted against an adjoining piece of carpet at seam 34. Seaming tape 100, comprised of adhesive 24, scrim 23, flexible backing 22, and rigid strips 21, is centered on seam 34 and adhered to backing 32 by adhesive 24. Carpet pad 31 rests underneath seaming tape 100. Several refinements are illustrated. First, adhesive layer 24 is not spread uniformly across scrim 23 but is instead more thickly applied at seam 34 between rigid strips 21. Adhesive 24 is spread as thinly as possible over the tops of rigid strips 21, and is tapered downward from the outside edges of rigid strips 21 and 21' to along both edges of scrim 23. Second, the backing 32 and scrim 23 are made to be convex between strips 21, creating a shallow depression centered on seam 34. Third, backing 32 and scrim 23 are made concave over both rigid strips 21, creating a slight protrusions centered over each rigid strip 21. To create this pattern of a concavity centered between two flanking convexities, each strip 21 and 21' is preferably located about five-sixteenths (0.31) inches from the seam 34 and is preferably about five-sixteenths (0.31) inches wide and twenty-four thousandths (0.024) inches thick.

The advantages offered by the configuration shown in FIG. 3 are illustrated by FIG. 4, showing the appearance of the same seam under tension. In FIG. 4, the tension imparted to the carpet by the stretch is carried across the seam primarily by scrim 23. Scrim 23 is adhered to the bottom surface of backing 32. The offset between the tension-carrying plane of the backing 32 and the scrim 23 gives rise to a couple or bending moment that bends scrim 23 upwards at seam 34. That is, the same forces that give rise to seam peaking in prior art tapes tend to evert the concavity that existed at seam 34 before the carpet was stretched, shown in FIG. 3. However, to evert the concavity at seam 34, the slope of scrim 23 at the transition points between the concavity and its two flanking convexities must be reversed. To reverse the slope, the two flanking convexities must be forced into concavities. However, the scrim in the area of the convexities is restrained by the rigid strips 21. The rigid strips 21 and 21' resist being bent into a concave shape and exert an equal and opposite downward bending force that tends to flatten the eversion of scrim 23 at seam 34. Consequently, the carpet in the area of seam 34 appears to flatten and the seam 34 becomes less visible when tension is applied across it.

Figure 5:
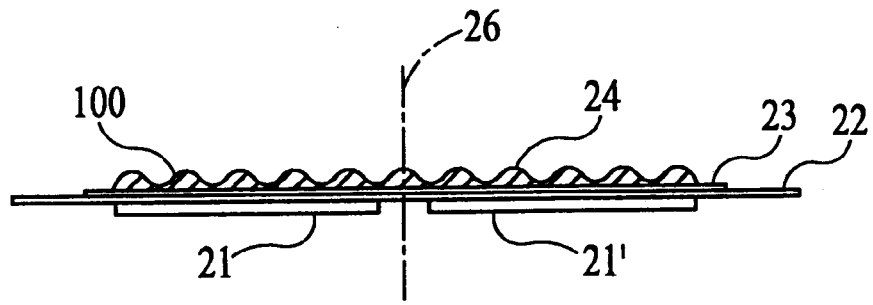
FIG. 5 is a cross section of a seaming tape according to the present invention, showing an alternate embodiment of the rigid members.

The pattern of a central concavity flanked by convexities in the unstretched seam is obtained by careful selection of the size and placement of the rigid strips 21 and 21' and contouring of the adhesive as described above. An alternative approach is to make the rigid strips 21 and 21' wider in order to prevent the seam from peaking, as shown in FIG. 5. FIG. 5 illustrates an alternative embodiment of the invention, with the same components: adhesive 24, scrim 23, flexible barrier 22, and rigid strips 21 and 21'. The rigid strips are about one and one-half inches wide, wider than in preferred embodiment of the invention. Because the rigid strips are widened, they must also be stiffened to prevent the seam bending moment from creating noticeable deflection across the width of the rigid strips. To obtain greater stiffness while maintaining a thin profile, it is preferable to make the widened rigid strips 21 and 21' from a material with a high flexural modulus, such as spring steel. As noted before, steel strips have the disadvantage of making the tape more difficult to cut to length. Furthermore, to make the rigid strips both wider and stiffer, more material must be used, increasing the cost of the tape. Therefore, it is preferable to use relatively narrow rigid strips, configured to create a concavity at the seam flanked by convexities as disclosed above.

Figure 6:
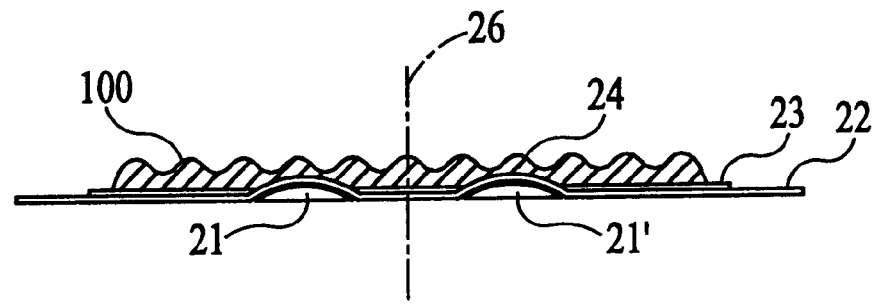
FIG. 6 is a cross section of a seaming tape according to the present invention, showing an alternate embodiment of the rigid members designed to enhance performance of the tape.

In an alternative embodiment of the invention, shown in FIG. 6, the rigid strips 21 and 21' are made convex on their upper surface. The rigid strips are preferably 0.20 to 0.50 inches wide and 0.020 to 0.050 inches thick at their thickest point, if polyamide, PET, or similar materials are used. The bottom surface of rigid strips 21 and 21' may be flat (as shown) or may be concave and parallel to the upper surface (not shown). The arrangement and composition of adhesive 24, scrim 23, and flexible barrier 22 is otherwise the same as discussed above. The convex upper surface of the rigid strips 21 and 21' in this embodiment are useful for forming the pattern of two convexities flanking a central concavity. Furthermore, the edges of rigid strips 21 and 21' are tapered avoiding abrupt changes in the profile of the tape. Rigid strips 21 and 21' with a convex upper surface may be economically formed by extrusion of materials such as polyamide. Alternatively, the convex shape may be roll formed from flat strips of ductile material such as steel.

Figure 7:
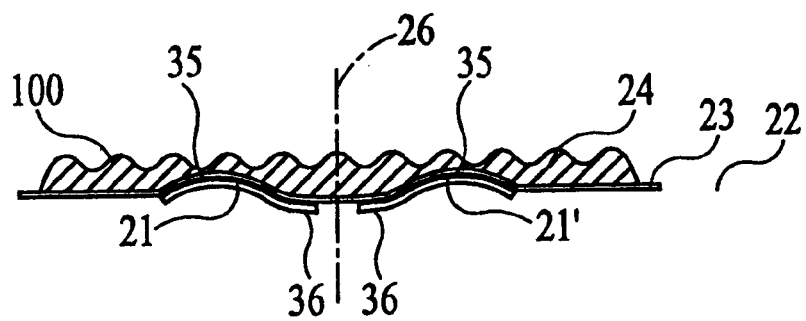
FIG. 7 is a cross section of a seaming tape according to the present invention, showing another alternate embodiment of the rigid members designed to enhance performance of the tape.

In an alternative embodiment, the rigid strips 21 and 21' may be used to form the central concavity as well as the flanking convexities. Referring to FIG. 7, each rigid strip 21 and 21' has a concave portion 36 oriented towards the center of the seaming tape, and a convex portion 35 oriented towards the edges of the seaming tape. The rigid strips are preferably 0.20 to 0.50 inches wide and 0.020 to 0.050 inches thick at their thickest point, if polyamide, PET, or similar materials are used. The maximum distance between the top and bottom surfaces of the rigid strip is preferably between 0.040 and 0.10 for typical carpet applications. It is preferable to make the rigid strips as two separate members on either side of the seam, rather than as one single member extending across the seam. If the rigid strip is a single piece spanning the seam, it will tend to carry tension across the seam and thus will profile. However, it is anticipated that forming a central concavity and flanking convexities in a single rigid strip, even one spanning the seam, will provide some benefit as compared to a relatively flat rigid member spanning the seam. If the rigid strip is sufficiently thin, profiling will not be noticeable. However, peaking will be reduced because the concave rigid strip will counteract the moment created by offset and opposing tension forces in the seam while tending to flatten under tension.

The invention may be practiced by integrating rigid strips into a seam independently of a seaming tape. In this method, the rigid strip 21 is adhered to the carpet backing of a first piece of carpet along the edge of the carpet to be seamed. Rigid strip 21' is adhered to the carpet backing of a second piece of carpet along the edge of the carpet to be seamed. Rigid strips 21 and 21' may be flat, concave, or concave/convex. Any suitable adhesive may be used to adhere rigid strips 21 and 21' to the carpet backing, but it is preferable to use a pressure sensitive adhesive that is pre-coated on to one side of the rigid strips and protected by a release liner that is removed prior to installation. After rigid strips 21 and 21' are adhered to the carpet backing, the seam is made using conventional seaming tape and face-seaming or back-seaming techniques. In the alternative, the seam may be made first in the conventional manner, using conventional seaming tape, and the rigid strips may be adhered the underside of the seaming tape after the seam is made. Either way, the end result is a seam that incorporates rigid strips in the manner provided for by a seaming tape according to the present invention.

EXAMPLE

A three foot length of standard width seaming tape sold under the trade name "K-40" and commercially available from Orcon Corporation in Union City, Calif., was cut from a standard roll. Two strips of relatively rigid and low profile plastic material, each about three-eighths (0.375) inches wide and about twenty-four thousandths (0.024) inches thick and commercially available as nylon 6/6 from McMaster- Carr Supply Company of Los Angeles, Calif., were cut to a length of three feet. One edge of each strip was positioned about three-sixteenths (0.1875) inches from the longitudinal centerline of the tape. The strip was continuously adhered to the paper backing of the seaming tape using a sprayable adhesive available as Hi-Strength 90 Spray Adhesive from 3M Industrial Tape and Specialties Division of St. Paul, Minn. A four foot long by three foot wide piece of 38 ounce cut pile tufted nylon face carpeting with standard action back secondary was cut into two halves. The two halves were seamed together using the modified seaming tape by a conventional face seaming technique. While making the seam, care was taken to press the carpet down into the adhesive at the seam line so that a visible concavity along the seam line was apparent in the finished, unstretched seam. An identical piece of carpet was seamed onto one end of the test piece using a three-foot length of unmodified K-40 seaming tape, for purposes of comparison. The test piece was stretched to between one, and one and one-half percent (1.0% to 1.5%) stretch using a power stretcher. The two seams were compared under illumination from a 100 watt floodlight placed approximately six inches above the test piece and directed across the surface of the piece. The seam made with conventional K-40 tape peaked visibly under tension. The seam made with the K-40 tape modified according to the invention flattened under tension and became nearly invisible.

Various modifications and alterations of the embodiments of this invention disclosed in this application will become apparent to those skilled in the art without departing from the scope of this invention. The scope of this invention is to be determined from the appended claims, and is not to be limited by the illustrative embodiments and examples set forth herein.

What is claimed is:

1. A seaming tape for joining flexible materials along a butt seam and for minimizing peaking and profiling of the seam while carrying tension across the seam, comprising:
   (a) a scrim, having a longitudinal centerline,
   (b) an adhesive adhered to a first side of said scrim for adhering the seaming tape to the flexible materials to be joined thereby,
   (c) a first rigid strip adhered to said scn'm, on one side of said centerline in a position substantially parallel to and spaced from said centerline, and
   (d) a second rigid strip adhered to said scrim, on an opposite side of said centerline from said first rigid strip in a position substantially parallel to and spaced from said centerline.

2. The seaming tape according to claim 1, further comprising a flexible barrier attached along a top surface to a second side of said scrim.

3. The seaming tape according to claim 2, wherein said flexible barrier is interposed between said scrim and said first and second rigid strips.

4. The seaming tape according to claim 2, wherein said first and second rigid strips are adhered between said flexible barrier and said scrim.

5. The seaming tape according to claim 2, wherein a bottom surface of said flexible barrier has a coating for reducing friction between the seaming tape and an underlying surface.

6. The seaming tape according to claim 1, wherein said adhesive is a then, noplastic material.

7. The seaming tape according to claim 1, wherein an upper surface of said first rigid strip and said second rigid strip are convex.

8. The seaming tape according to claim 1, wherein an upper surface of said first rigid strip and said second rigid strip are concave for a first portion adjacent to said centerline of said scrim, and convex for a second portion distal to said centerline of said scrim.

9. A carpet seaming tape for joining carpet along a butt seam and forv/minimizing peaking and profiling of the seam, comprising:
   (a) a scrim, having a longitudinal centerline,
   (b) an adhesive adhered to said scrim for adhering the seaming tape to a backing of the carpet along the butt seam,
   (c) a first rigid strip mounted to said tape in a position substantially parallel to and spaced from said centerline on one side of said centerline,
   (d) a second rigid strip adhered to said scrim mounted to said tape in a position substantially parallel to and spaced from said centerline on an opposite side of said centerline from said first rigid strip, and
   (e) a flexible barrier adhered to and underneath said scrim for preventing said adhesive from contacting surfaces beneath the carpet to be seamed.

10. The seaming tape according to claim 9, wherein an upper surface of said first rigid strip and said second rigid strip are convex.

11. The seaming tape according to claim 9, wherein an upper surface of said first rigid strip and said second rigid strip are concave for a first portion adjacent to said centerline of said scrim, and convex for a second portion distal to said centerline of said scrim.

12. A carpet seaming tape for joining carpet along a butt seam and for minimizing peaking and profiling of the seam, comprising:
   (a) a scrim, having a longitudinal centerline,
   (b) an adhesive adhered to said scrim for adhering the seaming tape to a backing of the carpet along the butt seam,
   (c) a flexible barrier adhered to and underneath said scrim for preventing said adhesive from contacting surfaces beneath the carpet to be seamed,
   (d) a first rigid strip adhered to and underneath said flexible barrier, mounted to said tape in a position substantially parallel to and spaced from said centerline on one side of said centerline, and
   (e) a second rigid strip adhered to and underneath said flexible barrier, tape in a position substantially parallel to and spaced from said centerline on an opposite side of said centerline from said first rigid strip.

13. The seaming tape according to claim 12, wherein the upper surfaces of said first rigid strip and said second rigid strip are convex.

14. The seaming tape according to claim 12, wherein the upper surfaces of said first rigid strip and said second rigid strip are concave for a first portion adjacent to said centerline of said scrim, and convex for a second portion distal to said centerline of said scrim.

15. A method for joining separate pieces of flexible sheet material together along a common butted edge fon-ning a seam, and for minimizing seam peaking and profiling after tension is applied to the joined sheet material across the seam, comprising the steps of
   (a) positioning the pieces of flexible sheet material to be so that the surfaces of the sheet material are oriented in the same direction and the edges to be joined are butted against one another along one or more seams, (b) placing a strip of scrim onto one surface of both abutting sheet materials along the length of each seam so that the scrim is approximately centered on the seam, (c) adhering the scrim to the surface of both abutting sheet materials, (d) positioning a first rigid strip onto the surface of the scrim so that it is essentially parallel to the seam and spaced apart a distance from the seam, (e) adhering the first rigid strip to the scrim to the surface of one abutting sheet material, (f) positioning a second rigid strip onto the surface of the scrim on the opposite side of the seam with respect to the first rigid strip so that it is essentially parallel to the seam, is spaced apart a distance from the seam, and is on the opposite side of the seam from said first rigid strip, and (g) adhering the second rigid strip to the scrim and to the surface of one abutting sheet material opposite to the first rigid strip.

16. The method according to claim 15 further comprising the step of adhering a flexible barrier to the scrim.

17. The method according to claim 16 wherein the flexible barrier is placed between the scrim and both rigid strips and adhered to the scrim and to both rigid strips.

18. The method according to claim 15 wherein the flexible sheet material is carpeting, and the surface joined by said scrim is the carpet backing.

19. The method according to claim 18 wherein a first surface of said first and second rigid strips are adhered to the carpet backing before said scrim is adhered to the carpet backing, and said scrim is adhered to the carpet backing and to a second surface of said first and second rigid strips.

* * * * *